United States Patent
Nishijima

(10) Patent No.: US 9,515,561 B2
(45) Date of Patent: Dec. 6, 2016

(54) SWITCHING POWER SUPPLY DEVICE

(71) Applicant: FUJI ELECTRIC CO., LTD., Kawasaki-shi (JP)

(72) Inventor: Kenichi Nishijima, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/934,790

(22) Filed: Nov. 6, 2015

(65) Prior Publication Data

US 2016/0156271 A1    Jun. 2, 2016

(30) Foreign Application Priority Data

Nov. 27, 2014  (JP) ................. 2014-240223

(51) Int. Cl.
  *H02M 3/335*  (2006.01)
  *H02M 1/00*   (2006.01)

(52) U.S. Cl.
  CPC ..... *H02M 3/33523* (2013.01); *H02M 3/33507* (2013.01); *H02M 2001/0035* (2013.01)

(58) Field of Classification Search
  CPC ............ H02M 3/33538; H02M 3/33546; H02M 3/33515; H02M 3/33553; H02M 3/33507; H02M 3/33523
  See application file for complete search history.

(56) References Cited

U.S. PATENT DOCUMENTS

| 4,115,676 A | * | 9/1978 | Higuchi | ............... H02M 5/458 219/626 |
| 8,953,342 B2 | * | 2/2015 | Fang | ................. H02M 3/33507 363/147 |
| 2008/0278981 A1 | * | 11/2008 | Hachiya | ............ H02M 3/33507 363/74 |

(Continued)

FOREIGN PATENT DOCUMENTS

JP    H06-98539 A    4/1994
JP    2013-116026 A  6/2013

OTHER PUBLICATIONS

Fairchild Semiconductor, "AN-6756_JA Applying FAN6756 to Control a Flyback Power Supply with Ultra-Low Standby Power", [online], Mar. 22, 2012, Fairchild Semiconductor Corporation [Searched on Sep. 1, 2014], Internet <URL:https://www.fairchildsemi.co.jp/an/AN/AN-6756.pdf>.

*Primary Examiner* — Jeffrey Gblende
(74) *Attorney, Agent, or Firm* — Rabin & Berdo, P.C.

(57) ABSTRACT

An output voltage detection portion detects the change of a DC output voltage on a primary side of a transformer. A control circuit outputs a gate signal of a frequency corresponding to the detected change to stabilize the DC output voltage. A load transient detection portion includes capacitors and a capacitor and/or a resistor. The load transient detection portion detects the decrease of the DC output voltage caused by a load transient. Thus, when the control circuit is performing switching control in a long cycle under a light load, the load transient detection portion can detect a (Continued)

timing of the load transient without waiting until the next cycle switching so that the control circuit can vary the frequency of the gate signal to a frequency corresponding to a heavy load. Accordingly, it is possible to suppress the decrease of the DC output voltage at the time of the load transient.

4 Claims, 9 Drawing Sheets

(56) References Cited

U.S. PATENT DOCUMENTS

| | | | | |
|---|---|---|---|---|
| 2010/0195355 A1* | 8/2010 | Zheng | ............... | H02M 3/33507 363/21.12 |
| 2010/0208500 A1* | 8/2010 | Yan | .................... | H02M 3/33523 363/21.12 |
| 2011/0085354 A1* | 4/2011 | Wang | ................... | H02M 1/4225 363/21.02 |
| 2011/0194314 A1* | 8/2011 | Morota | ............. | H02M 3/33507 363/21.15 |
| 2013/0141947 A1 | 6/2013 | Sakurai et al. | | |
| 2014/0036548 A1* | 2/2014 | Yang | ..................... | H02M 3/335 363/21.07 |

* cited by examiner

SWITCHING POWER SUPPLY DEVICE

CROSS-REFERENCE TO RELATED APPLICATION

This application is based on, and claims priority to, Japanese Patent Application No. 2014-240223, filed on Nov. 27, 2014, contents of which are incorporated herein by reference.

BACKGROUND OF THE INVENTION

1. Field of the Invention

The present invention relates to a switching power supply device. Particularly, it relates to a switching power supply device in which a semiconductor switch connected to a primary side of a transformer to which a first DC voltage is applied is subjected to switching operation to thereby output a second DC voltage to a secondary side of the transformer.

2. Description of the Background Art

Among insulated switching power supply devices, a flyback type switching power supply device is typically applied to an application for small capacity power not higher than several tens of watts. The flyback type switching power supply device uses a transformer in which windings on a primary side and on a secondary side are opposite to each other in direction or in way of tapping so as to provide reverse characteristics between the primary side and the secondary side. A semiconductor switch connected in series with the primary-side winding of the transformer is subjected to switching operation to transmit primary-side electric power of the transformer to the secondary side thereof. That is, during an ON period of the semiconductor switch, a current flows so that energy can be stored in the transformer. When the semiconductor switch changes over to OFF, the stored energy is outputted from the secondary-side winding of the transformer through a diode.

As a system for stabilizing a secondary-side output voltage of the flyback type switching power supply device, there has been known a secondary-side control system in which fluctuation of the secondary-side output voltage is fed back to a primary-side control circuit by a photocoupler (e.g. see Fairchild Semiconductor, "AN-6756_JA Applying FAN6756 to Control a Flyback Power Supply with Ultra-Low Standby Power", [online], Mar. 22, 2012, Fairchild Semiconductor Corporation [Searched on Sep. 1, 2014], Internet <URL:https://www.fairchildsemi.co.jp/an/AN/AN-6756.pdf>). Moreover, there has been known a primary-side control system in which an auxiliary winding having the same polarity as that of the secondary-side winding of the transformer is used so that fluctuation of the voltage of the secondary-side winding can be indirectly detected by the auxiliary winding and fed back to a primary-side control circuit (e.g. see JP-A-2013-116026 (Paragraphs [0003] to [0005], FIG. 10)).

In the secondary-side control system, fluctuation of the secondary-side output voltage is detected by a shunt regulator, and the detected fluctuation of the output voltage is fed back to the primary side through the photocoupler to thereby stabilize the output voltage. The switching power supply device using the secondary-side control system however requires lots of components including the shunt regulator and the photocoupler in order to stabilize the output voltage. Therefore, attention has been recently focused on the primary-side control system which can reduce the number of components.

FIG. 7 is a circuit diagram showing an example of a flyback type switching power supply device using a primary-side control system according to the background art. FIG. 8 is a view of operation of the flyback type switching power supply device according to the background art when there occurs a load transient. FIG. 9 is a circuit diagram showing an example of the flyback type switching power supply device having a noise reduction function.

The switching power supply device has terminals 11 and 12 which receive a DC input voltage Vin. A smoothing capacitor C1 is connected to the terminals 11 and 12. A series connection circuit between a primary winding Np of a transformer T and a semiconductor switch S1 made of an MOSFET (Metal-Oxide-Semiconductor Field-Effect Transistor) is connected in parallel with the capacitor C1. A control circuit 13 which controls the switching power supply device is connected to the semiconductor switch S1.

The transformer T has an auxiliary winding Naux in order to obtain a power supply of the control circuit 13. A rectifying and smoothing circuit constituted by a diode D1 and a capacitor C2 is connected to the auxiliary winding Naux so that an output voltage of the rectifying and smoothing circuit can be supplied to the control circuit 13. A series circuit between resistors R1 and R2 is connected in parallel with the auxiliary winding Naux and a common connection portion between the resistors R1 and R2 is connected to the control circuit 13 to supply a feedback signal to the control circuit 13. Thus, primary-side control is performed.

Configuration is made in such a manner that a rectifying and smoothing circuit constituted by a diode D2 and a capacitor C3 is connected to a secondary winding Ns of the transformer T so that a DC output voltage Vout can be outputted to terminals 14 and 15. A dummy resistor R3 for suppressing the DC output voltage Vout from increasing under a light load or no load is connected to the terminals 14 and 15.

Incidentally, in the switching power supply device, a reference potential of the primary-side circuit is connected to a primary-side ground PGND and a reference potential of the secondary-side circuit is connected to a secondary-side ground SGND.

In the switching power supply device having the aforementioned configuration, when a DC input voltage Vin is supplied to the terminals 11 and 12, the DC input voltage Vin is smoothed by the capacitor C1 and applied to the series circuit between the primary winding Np of the transformer T and the semiconductor switch S1. Here, when the control circuit 13 makes control to turn ON the semiconductor switch S1, a current flows into the primary winding Np of the transformer T so that energy can be stored in the transformer T. Next, when the control circuit 13 makes control to turn OFF the semiconductor switch S1, the energy stored in the transformer T is released so that a current can flow from the secondary winding Ns through the diode D2. This current is smoothed by the capacitor C3 to turn into a DC output voltage Vout.

When a voltage occurs in the secondary winding Ns, a voltage proportional to the voltage (voltage in which a forward voltage of the diode D2 is added to the DC output voltage Vout) occurring in the secondary winding Ns also occurs in the auxiliary winding Naux. This voltage is divided by the resistors R1 and R2. A voltage signal divided by the resistors R1 and R2 is supplied as a feedback signal corresponding to the DC output voltage Vout to a terminal VS1 of the control circuit 13. The control circuit 13 outputs a gate signal Vg for controlling the semiconductor switch S1 to a terminal OUT. On this occasion, the control circuit 13 changes a cycle or an ON-time ratio of the gate signal for turning ON/OFF the semiconductor switch S1 based on the voltage signal supplied to the terminal VS1, to thereby stabilize the DC output voltage Vout. That is, in the case where the DC output voltage Vout substantially rarely changes asunder a light load or no load, the control circuit 13 fixes an ON-width of the gate signal Vg of the semiconductor switch S1 (to a minimum width) and elongates the cycle (reduces the frequency) of the gate signal Vg to thereby reduce power consumption. On the other hand, when the load becomes heavy and the DC output voltage Vout decreases, the control circuit 13 shortens the cycle (increases the frequency) of the gate signal Vg of the semiconductor switch S1 in accordance with the voltage supplied to the terminal VS1. When the frequency of the gate signal Vg of the semiconductor switch S1 reaches the highest frequency in some cases, the control circuit 13 performs PWM (Pulse Width Modulation) control for increasing the ON-time ratio so as to increase the energy supplied to the secondary-side circuit.

Description will be made here about the operation of the switching power supply device in which there occurs a load transient to a heavy load when the switching power supply device is operating under a light load or no load. When the switching power supply device is operating under a light load or no load, a fine current flows as the output current Iout and the DC output voltage Vout is controlled to a substantially constant voltage, as shown in FIG. 8. In addition, the semiconductor switch S1 performs switching operation in accordance with a gate signal Vg having a long cycle Ta to thereby supply energy consumed by the fine current.

When the load state suddenly changes from the light-load or no-load state to a heavy-load state, the output current Iout suddenly increases to a value corresponding to the load but the DC output voltage Vout decreases gradually. As soon as the decrease of the DC output voltage Vout caused by the load transient is detected based on a signal applied to the terminal VS1 of the control circuit 13 during next switching operation of the semiconductor switch S1, the control circuit 13 changes the cycle of the gate signal Vg to a short cycle Tb. In this manner, the DC output voltage Vout increases gradually to return to the voltage of a predetermined value. Incidentally, the degree of the decrease (ΔVout) of the DC output voltage Vout changes depending on the timing when the load transient occurred in the cycle Ta in which the switching power supply device was under the light load or no load. That is, as the timing when the load transient occurred is closer to immediately after the pulse output of the gate signal Vg, the degree of the decrease (ΔVout) of the DC output voltage Vout is smaller. As the timing when the load transient occurred is closer to the next pulse output of the gate signal Vg, the degree of the decrease (ΔVout) of the DC output voltage Vout is larger due to occurrence of a delay in the detection of the load transient. Incidentally, when the load suddenly changes from the heavy load to the light load or no load, the gate signal Vg changes from the short cycle (high frequency) to the long cycle (short frequency), causing no delay in the detection of the load transient. Accordingly, the degree of the increase (ΔVout) of the DC output voltage Vout becomes small.

In the switching power supply device, EMI (Electro-Magnetic Interference) noise occurs in accordance with switching operation of the semiconductor switch S1. However, such EMI noise is generally reduced (e.g. see Fairchild Semiconductor, "AN-6756_JA Applying FAN6756 to Control a Flyback Power Supply with Ultra-Low Standby Power", [online], Mar. 22, 2012, Fairchild Semiconductor Corporation [Searched on Sep. 1, 2014], Internet <URL: https://www.fairchildsemi.co.jp/an/AN/AN-6756.pdf>, or JP-A-6-98539 (Paragraphs [0014] to [0018], FIG. 1)).

A switching power supply device shown in FIG. 9 has such a noise reduction function as described in Fairchild Semiconductor, "AN-6756_JA Applying FAN6756 to Control a Flyback Power Supply with Ultra-Low Standby Power", [online], Mar. 22, 2012, Fairchild Semiconductor Corporation [Searched on Sep. 1, 2014], Internet <URL: https://www.fairchildsemi.co.jp/an/AN/AN-6756.pdf> or JP-A-6-98539 (Paragraphs [0014] to [0018], FIG. 1). That is, in the switching power supply device, a capacitor C4 is inserted between the primary-side ground PGND of the primary side and the secondary-side ground SGND of the secondary side which are floating to each other in the transformer T. Thus, EMI noise occurring due to switching operation of the semiconductor switch S1 is dropped from the primary-side ground PGND nearest to the source of the EMI noise to secondary-side ground SGND serving as a load-side frame ground through the capacitor C4 so that the EMI noise can be attenuated.

In the flyback type switching power supply device using the primary-side control system according to the background art, the secondary-side output voltage cannot be detected and fed back to the primary side unless the semiconductor switch performs switching operation. Particularly, when the switching power supply device is operating under a light load or no load, the cycle of the switching operation of the semiconductor switch is long. Accordingly, when the load suddenly changes to a heavy load in the long cycle, the load transient cannot be detected until next switching operation. Therefore, detection delay occurs before the decrease of the output voltage caused by the load transient is detected by the next switching operation and the switching operation based on a short cycle is started. There is a problem that the output voltage may decrease largely transitionally at some timing of the load transient.

SUMMARY OF THE INVENTION

The invention has been accomplished in consideration of such a problem. An object of the invention is to provide a switching power supply device using a primary-side control system, in which transient response to a load transient to a heavy load can be improved when the switching power supply device is operating under a light load or no load so that the decrease of an output voltage can be suppressed.

In order to solve the foregoing problem, according to the invention, there is provided a switching power supply device. The switching power supply device is provided with: a transformer which has a primary winding receiving a DC voltage, a secondary winding and an auxiliary winding; a semiconductor switch which is connected in series with the primary winding so as to perform switching operation; an output voltage generation circuit which includes a rectifying and smoothing circuit connected to the secondary winding so as to output a DC output voltage; an output voltage detection portion which is connected to the auxiliary winding so as to generate and output an output voltage detection signal corresponding to the DC output voltage of the output voltage generation circuit; a control circuit which performs switching control on the semiconductor switch upon reception of the output voltage detection signal so as to output a control signal for stabilizing the DC output voltage; and a load transient detection portion which is connected to the output voltage generation circuit so as to detect a load transient in which the DC output voltage suddenly changes in a decreasing direction, and to output a load transient detection signal to the control circuit. Here, the control circuit performs switching control on the semiconductor switch upon reception of the load transient detection signal so that the output voltage detection portion can detect the DC output voltage appearing after the reception of the load transient detection signal.

In the switching power supply device having the aforementioned configuration, the control circuit performs switching control on the semiconductor switch upon reception of the load transient detection signal. Accordingly, the output voltage detection portion located on the primary side can immediately know the secondary-side DC output voltage state so that there is an advantage that transient response can be improved.

The load transient detection portion has a configuration in which a capacitor provided as a measure against noise is used to feed back the secondary-side DC output voltage state to the primary side. Thus, the load transient detection portion can be achieved in a simple configuration.

DETAILED DESCRIPTION OF THE INVENTION

Figure 1:
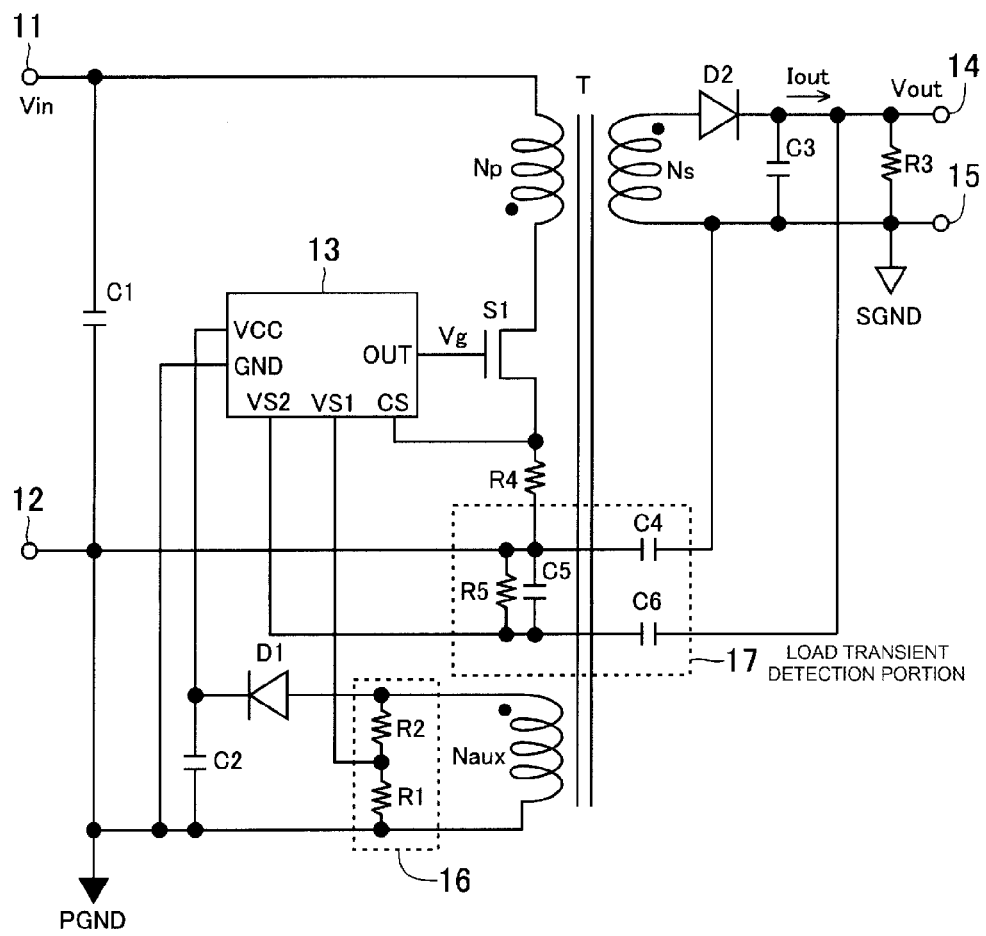
FIG. 1 is a circuit diagram showing an example of a switching power supply device according to a first embodiment.

Embodiments of the invention each of which is applied to a flyback type switching power supply device using a primary-side control system will be described below in detail by way of example with reference to the drawings. Incidentally, in the following description, terminal names of each circuit and a voltage, a signal, etc. in each of the terminals in the drawings may be denoted by the same reference signs correspondingly in some cases.

Figure 2:
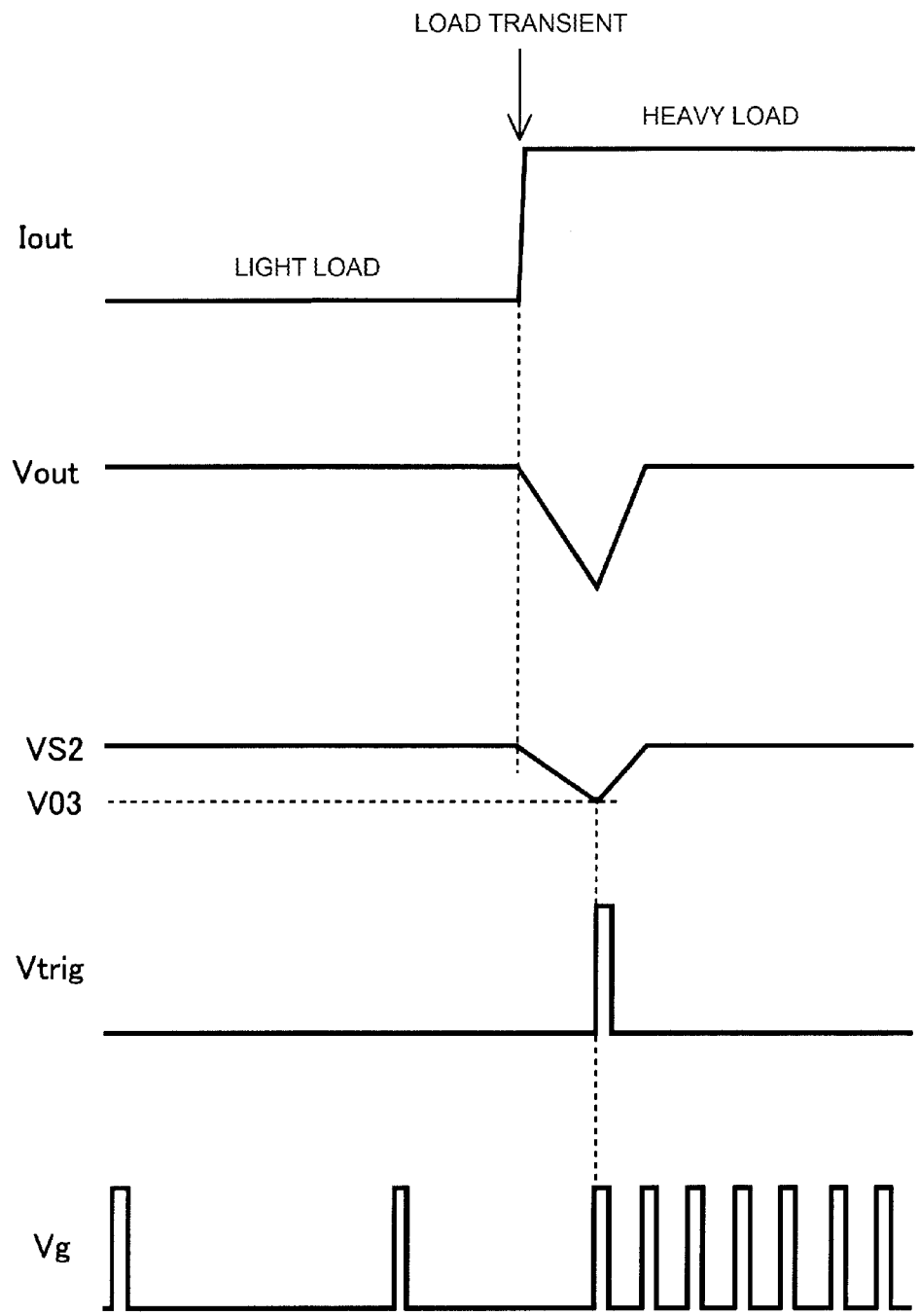
FIG. 2 is a main part operation waveform view of the switching power supply device according to the first embodiment in which a single capacitor is selected as an impedance element of a load transient detection portion when there occurs a load transient.
Figure 3:
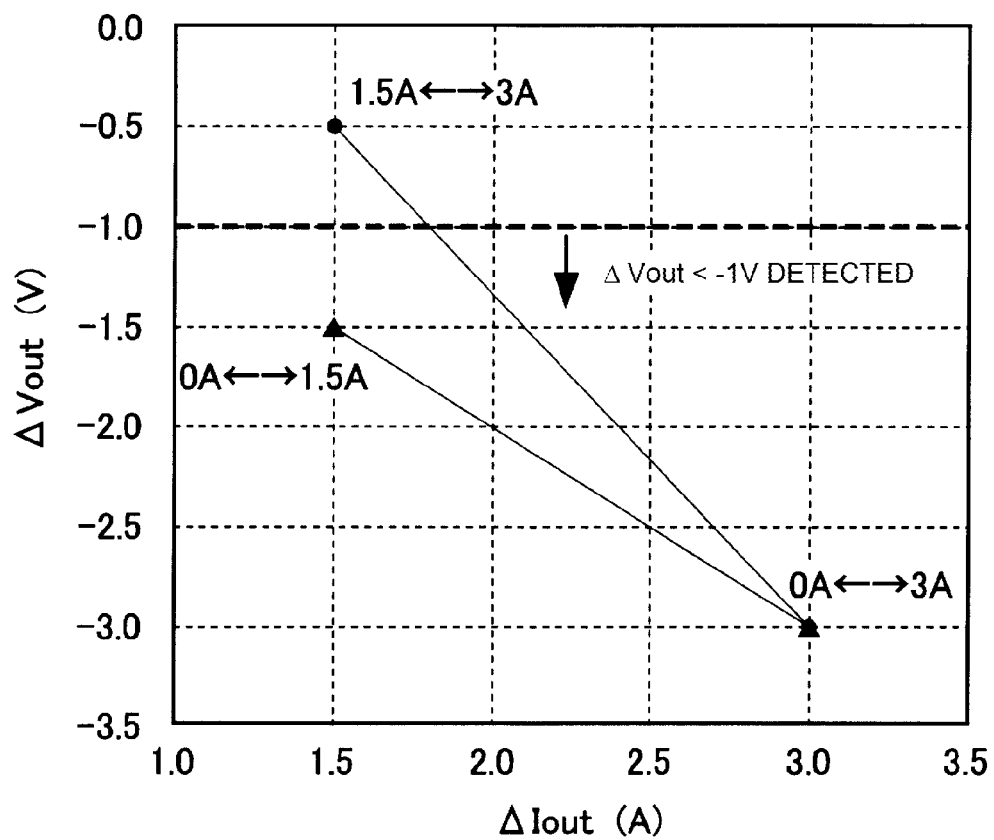
FIG. 3 is a graph showing examples of experimental values of a fluctuation width of a DC output voltage when an output current is changed suddenly.
Figure 7:
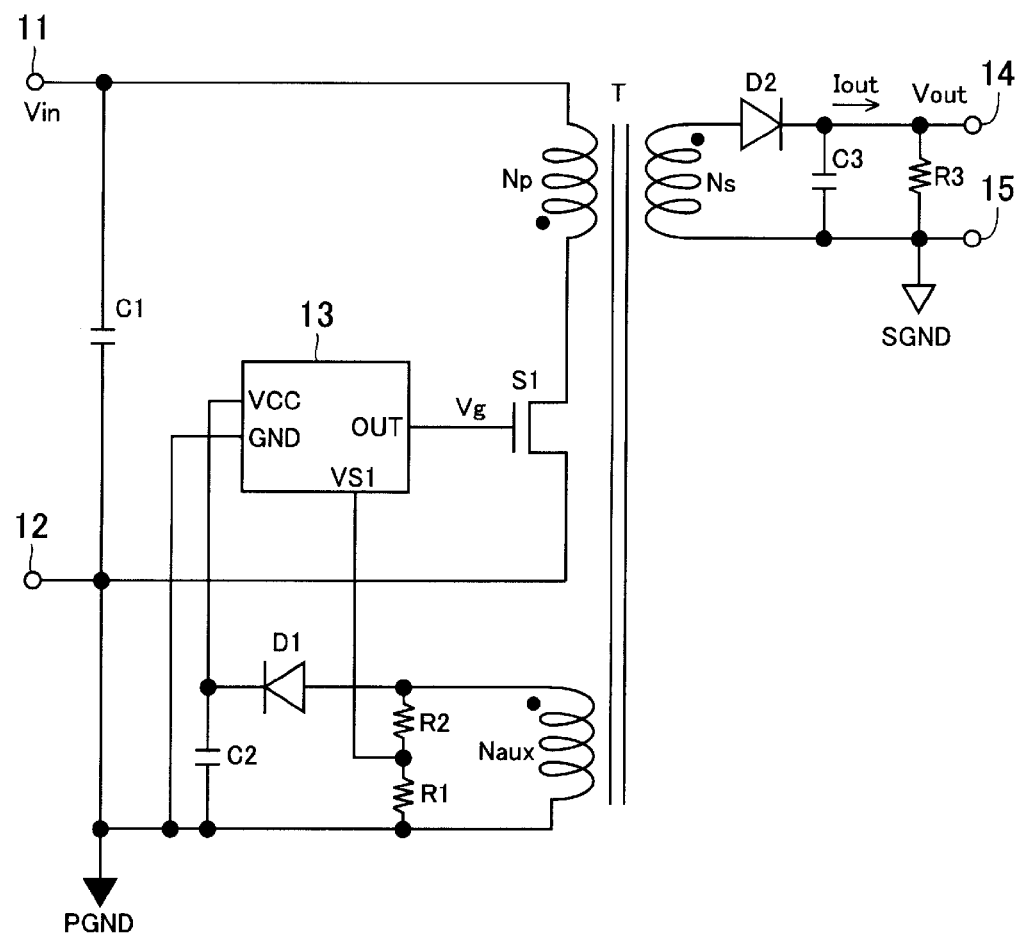
FIG. 7 is a circuit diagram showing an example of a flyback type switching power supply device using a primary-side control system according to the background art.
Figure 8:
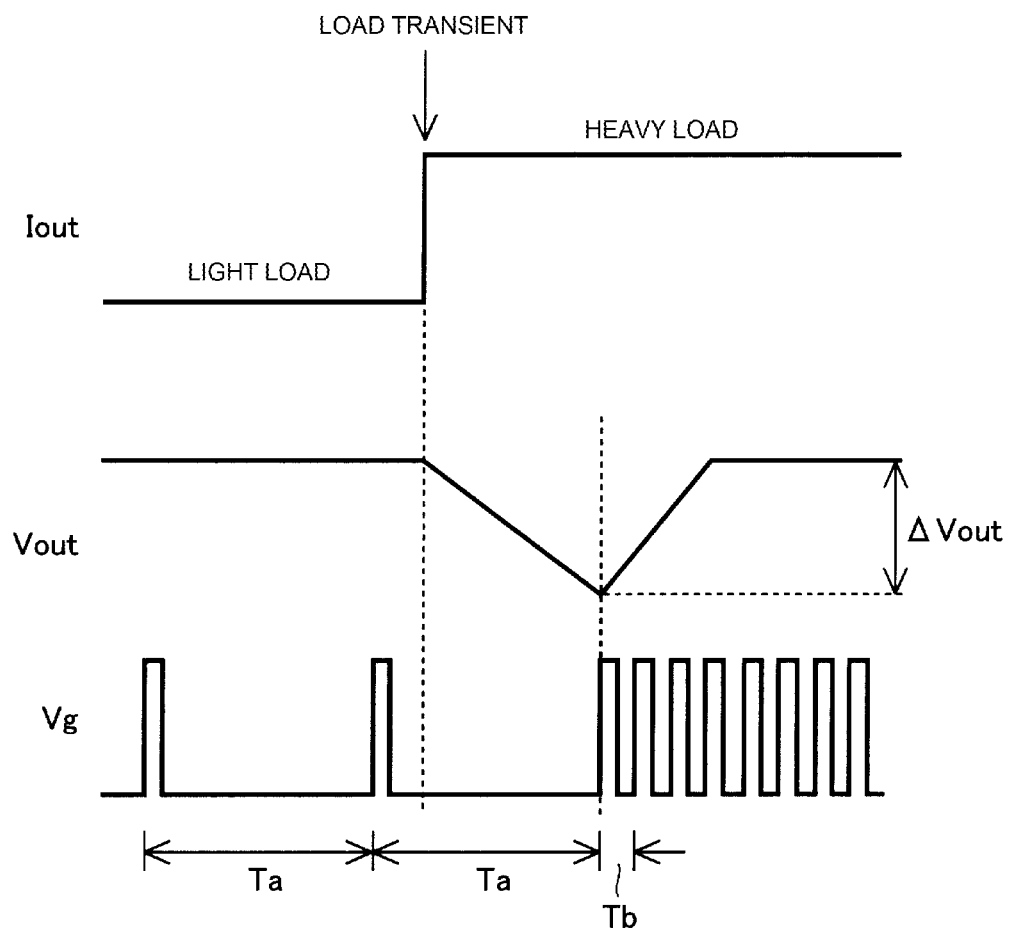
FIG. 8 is a view of operation of the flyback type switching power supply device according to the background art when there occurs a load transient.
Figure 9:
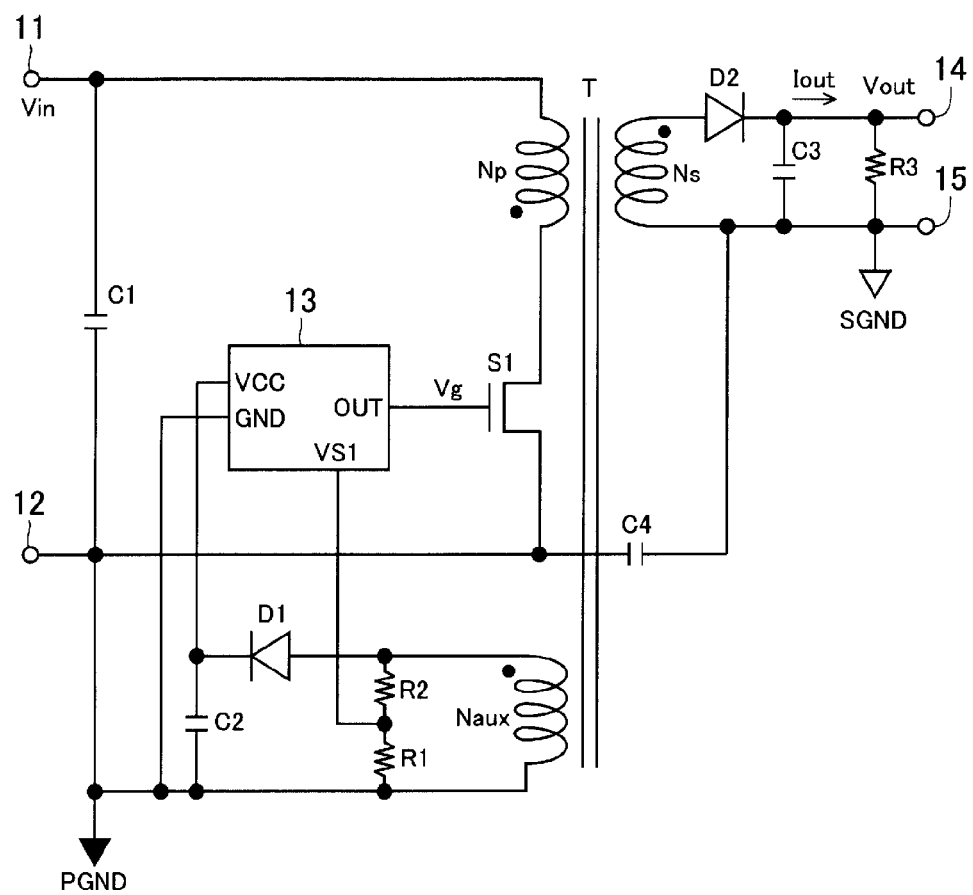
FIG. 9 is a circuit diagram showing an example of the flyback type switching power supply device having a noise reduction function.

FIG. 1 is a circuit diagram showing an example of a switching power supply device according to a first embodiment. FIG. 2 is a main part operation waveform view of the switching power supply device according to the first embodiment in which a single capacitor is selected as an impedance element of a load transient detection portion when there occurs a load transient. FIG. 3 is a graph showing examples of experimental values of a fluctuation width of a DC output voltage when an output current is changed suddenly. Incidentally, constituent members the same as or equivalent to those in the circuit shown in FIG. 7 are denoted by the same reference signs correspondingly.

This switching power supply device has a terminal 11 which receives a DC input voltage Vin. The terminal 11 is connected to one terminal of a capacitor C1 and connected to one terminal of a primary winding Np of a transformer T. The other terminal of the capacitor C1 is connected to a terminal 12 whose potential is equal to the potential of a primary-side ground PGND. The other terminal of the primary winding Np of the transformer T is connected to a drain of a semiconductor switch S1 made of an MOSFET. A source of the semiconductor switch S1 is connected to the terminal 12 through a resistor R4 and connected to a terminal CS of a control circuit 13. The resistor R4 detects a current flowing into the primary winding Np of the transformer T. A gate of the semiconductor switch S1 is connected to a terminal OUT of the control circuit 13.

The transformer T has an auxiliary winding Naux. One terminal of the auxiliary winding Naux is connected to an anode of a diode D1. A cathode of the diode D1 is connected to one terminal of a capacitor C2 and a terminal VCC of the control circuit 13. The other terminal of the capacitor C2 is connected to the other terminal of the auxiliary winding Naux, a terminal GND of the control circuit 13 and the terminal 12.

A series circuit between resistors R1 and R2 is connected in parallel with the opposite terminals of the auxiliary winding Naux to form an output voltage detection portion 16 which monitors the change of a DC output voltage Vout. A common connection portion between the resistors R1 and R2 is connected to a terminal VS1 of the control circuit 13.

The transformer T has a secondary winding Ns whose one terminal is connected to an anode of a diode D2. A cathode of the diode D2 is connected to one terminal of a capacitor C3 and a terminal 14. The terminal 14 serves as a voltage output terminal which outputs the DC output voltage Vout. The other terminal of the capacitor C3 is connected to the other terminal of the secondary winding Ns and a terminal 15. The potential of the terminal 15 is equal to the potential of a secondary-side ground SGND. Moreover, a dummy resistor R3 for suppressing the DC output voltage Vout from increasing under a light load or no load is connected to the terminals 14 and 15. Here, a rectifying and smoothing circuit having the diode D2 and the capacitor C3 and the dummy resistor R3 form an output voltage generation circuit.

The other terminal of the secondary winding Ns of the transformer T is connected to one terminal of a capacitor C4 which is used as a measure against noise in the switching power supply device. The other terminal of the capacitor C4 is connected to a terminal of the resistor R4 on a side whose potential is equal to the potential of the primary-side ground PGND. In the switching power supply device, a series circuit between an impedance element and a capacitor C6 is further inserted between a common connection portion between the capacitor C4 and the resistor R4 and the terminal 14 of a secondary-side circuit. The impedance element includes a capacitor C5 and a resistor R5 connected in parallel. A common connection portion between the parallel circuit between the capacitor C5 and the resistor R5 and the capacitor C6 is connected to a terminal VS2 of the control circuit 13. Here, the capacitors C4, C5 and C6 and the resistor R5 connected between the secondary-side terminals 14 and 15 form a load transient detection portion 17 which detects output fluctuation of the DC output voltage Vout. Although the parallel circuit between the capacitor C5 and the resistor R5 is shown as the impedance element in FIG. 1, the single capacitor C5 or the single resistor R5 may be formed as the impedance element. The principle for detection of the load transient varies depending on what is selected as the impedance element.

When the DC output voltage Vout fluctuates in the case where the single capacitor C5 is selected as the impedance element, a fluctuation amount (ΔVout) of the voltage between the terminals 14 and 15 is divided by the capacitor C6, the capacitor C5 and the capacitor C4. A voltage signal appearing in a connection point between the capacitor C5 and the capacitor C6 is fed back to the terminal VS2 of the control circuit 13. When, for example, the capacitance values of the capacitors C4, C5 and C6 are made equal to one another, a load transient detection signal VS2 (ΔVout/3) obtained by dividing the fluctuation amount (ΔVout) of the DC output voltage Vout into three equal parts is inputted to the terminal VS2 of the control circuit 13.

In addition, when the single resistor R5 is selected as the impedance element, the DC output voltage Vout is inputted to a differentiation circuit made of a composite capacitor including the capacitors C4 and C6 and the resistor R5. Accordingly, a differential waveform of the DC output voltage Vout obtained by the differentiation circuit is inputted as the load transient detection signal VS2 to the terminal VS2 of the control circuit 13.

In addition, when the parallel circuit between the capacitor C5 and the resistor R5 is selected as the impedance element, a signal obtained by combining the divided voltage signal of the fluctuation amount (ΔVout) of the DC output voltage Vout and the differential signal of the DC output voltage Vout is inputted as the load transient signal VS2 to the terminal VS2 of the control circuit 13.

Upon reception of the load transient detection signal VS2 from the load transient detection portion 17, the control circuit 13 determines the sudden change of the load. The detection level on that occasion is set based on a fluctuation width of the DC output voltage Vout obtained when an output current Iout was really changed. According to the experimental values shown in FIG. 3, when the output current Iout was suddenly changed from about 0 amperes (A) to 1.5 amperes or when the output current Iout was suddenly changed from about 0 amperes to 3 amperes, the fluctuation amount (ΔVout) of the DC output voltage Vout was lower than −1 volt (V) (whose absolute value was larger than 1 V). In addition, when the output current Iout was suddenly changed from 1.5 amperes to 3 amperes, the fluctuation amount (ΔVout) was −0.5 volts. Accordingly, when, for example, a load transient from a light load (output current Iout=0 V) is detected based on the level of the divided voltage of the fluctuation amount (ΔVout) of the DC output voltage Vout, the detection level can be set at about −0.2 volts for operation. Even when the differential waveform of the DC output voltage Vout is used, a circuit constant can be determined in a similar manner based on data which were obtained when the output current Iout was changed.

In the switching power supply device having the aforementioned configuration, when a DC input voltage Vin is received by the terminals 11 and 12, the DC input voltage Vin is smoothed by the capacitor C1 and applied to the series circuit formed by the primary winding Np of the transformer T, the semiconductor switch S1 and the resistor R4. Here, when the control circuit 13 outputs a gate signal Vg for turning ON the semiconductor switch S1, the semiconductor switch S1 is turned on to allow a current to flow into the primary winding Np of the transformer T. Thus, energy is stored in the transformer T. On this occasion, induced currents generated in the secondary winding Ns and the auxiliary winding Naux of the transformer T are reverse to the directions of the diodes D1 and D2. Consequently, the induced currents do not flow.

Next, when the control circuit 13 outputs a gate signal Vg for turning OFF the semiconductor switch S1 and the semiconductor switch S1 is consequently turned OFF, the energy stored in the transformer T is released so that a current can flow from the secondary winding Ns through the diode D2. This current is smoothed by the capacitor C3 to turn into the DC output voltage Vout.

When the current flows into the secondary winding Ns, a current corresponding to the current flowing into the secondary winding Ns also flows into the auxiliary winding Naux. This current flows through the diode D1 and is smoothed by the capacitor C2 so as to turn into a power supply voltage VCC supplied to the terminal VCC of the control circuit 13. The voltage of the auxiliary winding Naux is divided by the resistors R1 and R2 of the output voltage detection portion 16 so that an output voltage detection signal VS1 divided by the resistors R1 and R2 of the output voltage detection portion 16 can be supplied as a signal corresponding to the DC output voltage Vout to the terminal VS1 of the control circuit 13. The control circuit 13 changes the cycle or the ON-time ratio of the gate signal Vg for turning ON/OFF the semiconductor switch S1 based on the output voltage detection signal VS1 supplied to the terminal VS1 so as to stabilize the DC output voltage Vout. That is, when the DC output voltage Vout rarely changes as under a light load or no load, the control circuit 13 fixes the gate signal Vg of the semiconductor switch S1 to a minimum ON width and elongates the cycle (reduce the frequency) of the gate signal Vg to thereby reduce power consumption. On the other hand, when the load becomes heavy and the DC output voltage Vout decreases gradually, the control circuit 13 shortens the cycle (increases the frequency) of the gate signal Vg of the semiconductor switch S1 with the minimum ON-width to which the gate signal Vg is fixed, correspondingly to the voltage supplied to the terminal VS1 to thereby increase the energy supplied to the terminals 14 and 15. In some cases, in which the frequency reaches the highest frequency, the control circuit 13 may perform PWM control to increase the ON-time ratio of the gate signal Vg.

Description will be made here about the operation of the switching power supply device in which there occurs a load transient to a heavy load when the switching power supply device is operating under a light load or no load. As shown in FIG. 2, when the switching power supply device is operating under a light load or no load, a fine current flows as the output current Iout so that the DC output voltage Vout can be controlled to a substantially constant voltage. In addition, the semiconductor switch S1 is subjected to switching operation in accordance with the gate signal Vg having a long cycle. Incidentally, FIG. 2 is a waveform view when the single capacitor C5 is selected as the impedance element of the load transient detection portion 17.

Assume that the load state suddenly changes to a heavy load when the switching power supply device is operating under a light load or no load. In this case, the output current Iout suddenly increases to a value corresponding to the load but the DC output voltage Vout decreases gradually in accordance with this sudden increase. The change of the DC output voltage Vout decreasing due to the load transient is divided by the load transient detection portion 17 so that a load transient detection signal VS2 divided thus can be inputted to the terminal VS2 of the control circuit 13. Upon reception of the load transient detection signal VS2, the control circuit 13 generates a trigger signal Vtrig to output a gate signal Vg for turning ON/OFF the semiconductor switch S1 only once. When the semiconductor switch S1 has changed over from ON to OFF, the control circuit 13 can detect the state of the DC output voltage Vout upon reception of an output voltage detection signal VS1 corresponding to the DC output voltage Vout from the output voltage detection portion 16. On this occasion, it can be known that the DC output voltage Vout is decreasing due to the load transient. Accordingly, the control circuit 13 shortens the cycle (increases the frequency) of the gate signal Vg in order to return the DC output voltage Vout to the voltage of the predetermined value. In some cases, the control circuit 13 may further enlarge the ON-time ratio of the gate signal Vg. Incidentally, although the load transient detection portion 17 detects not only the load transient from the light load or no load to the heavy load but also the load transient from the heavy load to the light lead or no load, the control circuit 13 ignores the detection of the load transient from the heavy load to the light load or no load. This is because the switching frequency under the heavy load is in the first place high enough to attain sufficiently fast response to the load transient from the heavy load to the light load or no load.

Figure 4:
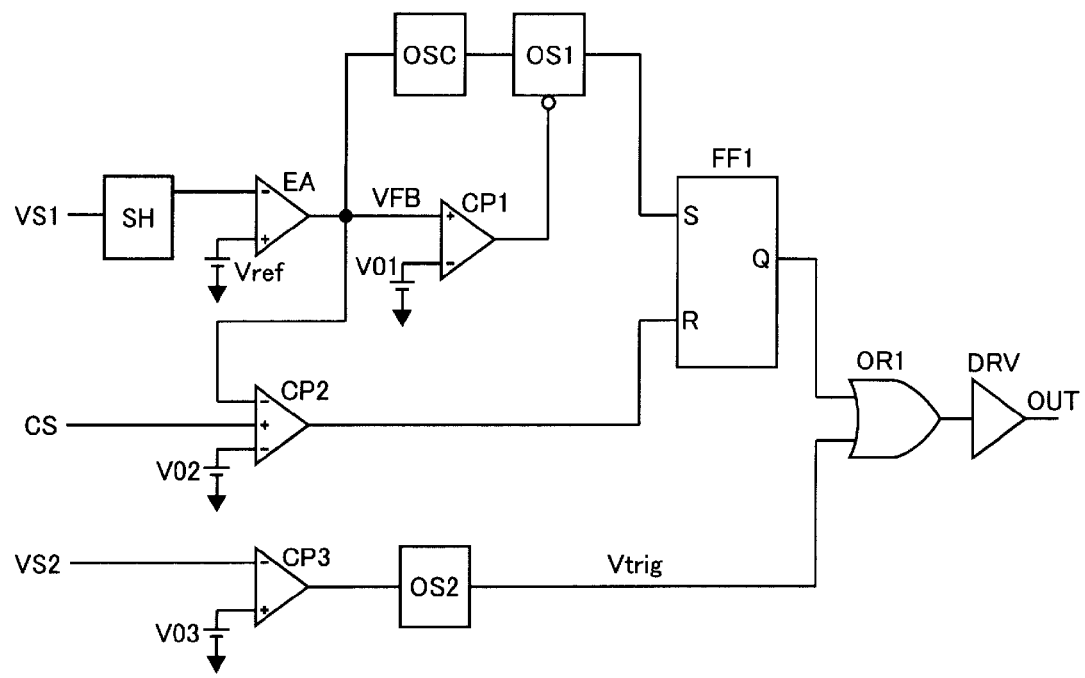
FIG. 4 is a circuit diagram showing a configuration example of a control circuit.

FIG. 4 is a circuit diagram showing a configuration example of the control circuit.

The control circuit 13 has a sample hold circuit SH which samples and holds an output voltage detection signal VS1 detected by the output voltage detection portion 16. An output terminal of the sample hold circuit SH is connected to an inverting input terminal of an error amplifier EA. A non-inverting input terminal of the error amplifier EA is connected to a positive electrode terminal of a reference voltage source Vref outputting a reference voltage Vref. A negative electrode terminal of the reference voltage source Vref is connected to the primary-side ground PGND. An output terminal of the error amplifier EA is connected to a variable frequency oscillator OSC, a non-inverting input terminal of a comparator CP1, and a first inverting input terminal of a comparator CP2. An output terminal of the variable frequency oscillator OSC is connected to an input terminal of a one-shot circuit OS1. An output terminal of the one-shot circuit OS1 is connected to a set input terminal S of a flip-flop FF1.

An inverting input terminal of the comparator CP1 is connected to a positive electrode terminal of a reference voltage source V01 outputting a reference voltage V01. A negative electrode terminal of the reference voltage source V01 is connected to the primary-side ground PGND. An output terminal of the comparator CP1 is connected to a disable terminal of the one-shot circuit OS1.

A non-inverting input terminal of the comparator CP2 receives a primary-side current detection signal CS detected by the resistor R4. A second inverting input terminal of the comparator CP2 is connected to a positive electrode terminal of a reference voltage source V02 outputting a reference voltage V02. A negative electrode terminal of the reference voltage source V02 is connected to the primary-side ground PGND. An output terminal of the comparator CP2 is connected to a reset input terminal R of the flip-flop FF1. An output terminal Q of the flip-flop FF1 is connected to one input terminal of an OR circuit OR1.

The load transient detection signal VS2 sent from the load transient detection portion 17 is inputted to an inverting input terminal of a comparator CP3. A non-inverting input terminal of the comparator CP3 is connected to a positive electrode terminal of a reference voltage source V03 outputting a reference voltage V03. A negative electrode terminal of the reference voltage source V03 is connected to the primary-side ground PGND. An output terminal of the comparator CP3 is connected to a one-shot circuit OS2. An output terminal of the one-shot circuit OS2 is connected to the other input terminal of the OR circuit OR1. An output terminal of the OR circuit OR1 is connected to an input terminal of a driver circuit DRV. An output terminal of the driver circuit DRV is connected to the terminal OUT of the control circuit 13.

In the control circuit having the aforementioned configuration, an error signal in which a difference between the output voltage detection signal VS1 held by the sample hold circuit SH and the reference voltage source Vref is amplified is outputted as a feedback signal VFB from the error amplifier EA. The feedback signal VFB is inputted to the variable frequency oscillator OSC. The variable frequency oscillator OSC outputs a pulse signal of a frequency corresponding to the magnitude of the feedback signal VFB.

Incidentally, assume that the comparator CP1 and the disable terminal of the one-shot circuit OS1 are not provided in the first embodiment but will be used in a second embodiment which will be described later.

The comparator CP2 compares the primary-side current detection signal CS with a smaller signal (voltage) of the feedback signal VFB and the reference voltage V02. When the primary-side current detection signal CS is smaller than the smaller signal (voltage) of the feedback signal VFB and the reference voltage V02, the comparator CP2 outputs a low level signal. When the primary-side current detection signal CS reaches the smaller signal (voltage) of the feedback signal VFB and the reference voltage V02, the comparator CP2 outputs a high level signal to reset the flip-flop FF1. On this occasion, a signal outputted from the output terminal Q of the flip-flop FF1 is supplied to the driver circuit DRV through the OR circuit OR1 and outputted as a gate signal Vg from the terminal OUT.

As the control of the semiconductor switch S1, the semiconductor switch S1 turns ON to increase the primary-side current detection signal CS when the flip-flop FF1 is set in accordance with the pulse from the one-shot circuit OS1. The increased primary-side current detection signal CS reaches the smaller signal (voltage) of the feedback signal VFB and the reference voltage V02, the flip-flop FF1 is reset to turn OFF the semiconductor switch S1. The OFF state continues unless a next pulse is outputted from the one-shot circuit OS1. The ON/OFF operation of the semiconductor switch S1 is controlled in accordance with the repetition of the operation. Incidentally, the reference voltage V02 is a voltage setting an overcurrent level.

The load transient detection signal VS2 sent from the load transient detection portion 17 is compared with the reference voltage V03 by the comparator CP3. When the load transient detection signal VS2 is not detected, a signal for triggering the one-shot circuit OS2 does not occur. When the load transient detection signal VS2 is larger (or lower) than the reference voltage V03, a high level signal is outputted from the comparator CP3. Thus, the one-shot circuit OS2 outputs a one-shot trigger signal Vtrig to forcibly turn ON/OFF the semiconductor switch S1 only once through the OR circuit OR1 and the driver circuit DRV. Consequently, when the semiconductor switch S1 is turned OFF, the control circuit 13 receives an output voltage detection signal VS1 corresponding to the DC output voltage Vout so that the control circuit 13 can detect the state of the DC output voltage Vout immediately after the load transient.

Figure 5:
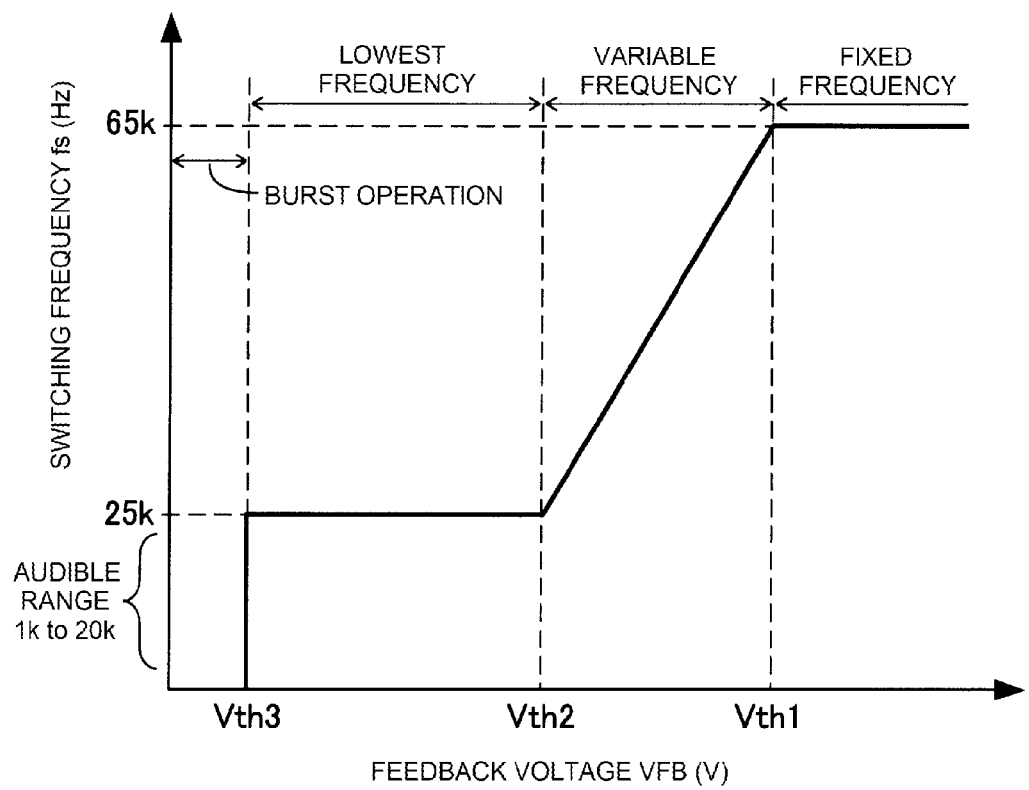
FIG. 5 is a characteristic graph of a variable frequency oscillator in a switching power supply device according to a second embodiment.
Figure 6:
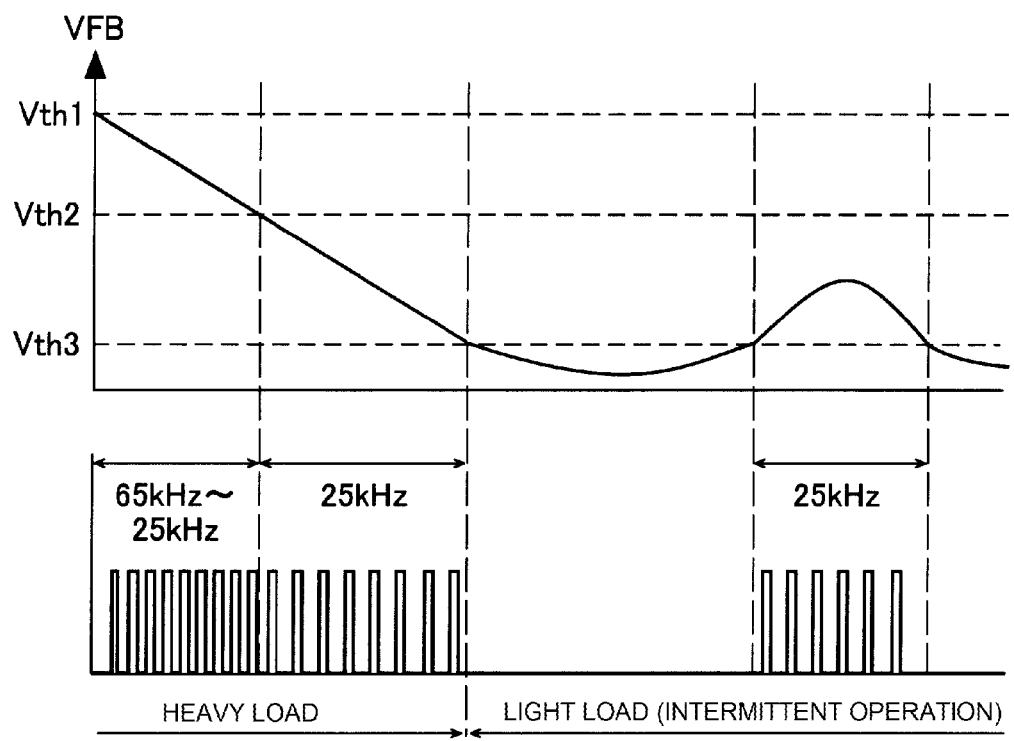
FIG. 6 is a view for explaining operation of the switching power supply device according to the second embodiment.

FIG. 5 is a characteristic graph of the variable frequency oscillator in the switching power supply device according to the second embodiment. FIG. 6 is a view for explaining operation of the switching power supply device according to the second embodiment. Incidentally, the switching power supply device according to the second embodiment has the same configuration as that of the switching power supply device according to the first embodiment shown in FIG. 1 except that the characteristic of the variable frequency oscillator OSC is changed. That is, the variable frequency oscillator OSC of the switching power supply device according to the first embodiment simply oscillates and outputs a pulse signal of a frequency corresponding to the magnitude of the feedback signal VFB as long as the frequency is not higher than the highest frequency.

In the switching power supply device according to the second embodiment, the variable frequency oscillator OSC changes a switching frequency fs in accordance with a level range of the feedback signal VFB. That is, as shown in FIG. 5 and FIG. 6, the highest frequency of the switching frequency fs is set at a frequency of 65 kHz within the variable frequency oscillator OSC. When the feedback signal VFB is not lower than a threshold Vth1, the switching frequency fs oscillates at the fixed frequency of 65 kHz. Incidentally, in some cases in which the switching frequency fs reaches the highest frequency, PWM control may be performed to change the ON-time ratio. The range in which the feedback signal VFB decreases from the threshold Vth1 to a threshold Vth2 is set as a variable frequency range in which the switching frequency fs oscillates in a range of from 65 kHz to 25 kHz in proportion to the feedback signal VFB. The range in which the feedback signal VFB decreases from the threshold Vth2 to a threshold Vth3 is set as a lowest frequency range in which the switching frequency fs oscillates constantly at 25 kHz. The range in which the feedback signal VFB is lower than the threshold Vth3 is set as a burst operation region in which the switching frequency fs does not oscillates.

The function to stop the switching operation when the feedback signal VFB is lower than the threshold Vth3 does not have to be provided in the variable frequency oscillator OSC but may be achieved by use of the aforementioned comparator CP1 and the aforementioned disable terminal of the one-shot circuit OS1. That is, it will go well as long as the variable frequency oscillator OSC always outputs the lowest frequency signal when the feedback signal VFB is equal or lower than the threshold Vth2, while the value of the reference voltage V01 inputted to the inverting input terminal of the comparator CP1 is made equivalent to the threshold Vth3. Thus, when the feedback signal VFB is lower than the threshold Vth3, the output of the comparator CP1, that is, the disable terminal of the one-shot circuit OS1 turns to a low level. Consequently, the one-shot circuit OS1 is disabled so that the operation of the one-shot circuit OS1 can be stopped. Accordingly, when the feedback signal VFB is lower than the threshold Vth3, a set pulse is not inputted to the set input terminal S of the flip-flop FF1 so that the switching operation can be stopped.

With the aforementioned configuration, when the DC output voltage Vout increases in the light-load state and the feedback signal VFB is lower than the threshold Vth3, the switching operation is stopped. When time passes in the state in which the switching operation has been stopped, the DC output voltage Vout decreases and the feedback signal VFB increases, with the result that oscillation at 25 kHz is performed again. Thus, the DC output voltage Vout is resumed and the feedback signal VFB becomes lower than the threshold Vth3. During the light-load state, such an intermittent operation is performed repeatedly. In this manner, the variable frequency oscillator OSC does not perform oscillation in a frequency lower than 25 kHz, particularly in a range including an audible frequency range (1 kHz to 20 kHz). Therefore, in the light-load state such as a standby operation, standby power is not decreased by the stop of oscillation at a frequency lower than 25 kHz and noise does not occur in the audible range. In addition, since a period of time in which the switching operation is not performed is provided, an energy loss caused by the switching operation under the low load can be suppressed.

Incidentally, although the variable frequency oscillator OSC of the switching power supply device according to the second embodiment performs an intermittent operation with the threshold Vth3 of the feedback signal VFB as a border, the variable frequency oscillator OSC may be constituted by two oscillators. That is, the variable frequency oscillator OSC has a configuration in which a first oscillator oscillating a pulse of a variable frequency and a second oscillator, for example, oscillating a pulse with a short ON-period at a frequency of about 10 Hz are provided to produce a logical product of the pulse of the variable frequency and the pulse with the short ON-period. In this manner, the variable frequency oscillator OSC can perform a burst operation at such a fixed frequency that, for example, three pulses are outputted in 10 Hz (100 milliseconds) when the load is light. Accordingly to the invention, response to the load transient from the light load or no load to the heavy load is sufficiently fast so that the variable frequency oscillator OSC can be constituted by the two oscillators.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A switching power supply device comprising:
    a transformer which has a primary winding receiving a DC voltage, a secondary winding and an auxiliary winding;
    a semiconductor switch which is connected in series with the primary winding so as to perform switching operation;
    an output voltage generation circuit which includes a rectifying and smoothing circuit connected to the secondary winding so as to output a DC output voltage;
    an output voltage detection portion which is connected to the auxiliary winding so as to generate and output an output voltage detection signal corresponding to the DC output voltage of the output voltage generation circuit;
    a control circuit which performs switching control on the semiconductor switch upon reception of the output voltage detection signal so as to output a control signal for stabilizing the DC output voltage; and a load transient detection portion which is connected to the output voltage generation circuit so as to detect a load transient in which the DC output voltage suddenly changes in a decreasing direction, and to output a load transient detection signal to the control circuit; wherein:

the control circuit performs switching control on the semiconductor switch upon reception of the load transient detection signal so that the output voltage detection portion can detect the DC output voltage appearing after the reception of the load transient detection signal; and the load transient detection portion includes a first capacitor having one end connected to a secondary-side ground of the output voltage generation circuit and another end connected to a primary-side ground of a primary-side circuit of the transformer, an impedance element having one end connected to the other end of the first capacitor, and a second capacitor having one end connected to another end of the impedance element and another end connected to a voltage output terminal of the output voltage generation circuit; and a signal occurring between the one end and the other end of the impedance element is outputted as the load transient detection signal to the control circuit.

2. The switching power supply device according to claim 1, wherein:

the impedance element is one of a resistor, a third capacitor or a parallel circuit between the resistor and the third capacitor.

3. The switching power supply device according to claim 2, wherein:

the first capacitor of the load transient detection portion uses a noise reduction capacitor which is connected between a secondary-side ground of the output voltage generation circuit and a primary-side ground of a primary-side circuit of the transformer and which is provided for reducing noise occurring due to switching operation of the semiconductor switch.

4. A switching power supply device comprising:

a transformer which has a primary winding receiving a DC voltage, a secondary winding and an auxiliary winding;

a semiconductor switch which is connected in series with the primary winding so as to perform switching operation;

an output voltage generation circuit which includes a rectifying and smoothing circuit connected to the secondary winding so as to output a DC output voltage;

an output voltage detection portion which is connected to the auxiliary winding so as to generate and output an output voltage detection signal corresponding to the DC output voltage of the output voltage generation circuit;

a control circuit which performs switching control on the semiconductor switch upon reception of the output voltage detection signal so as to output a control signal for stabilizing the DC output voltage; and a load transient detection portion which is connected to the output voltage generation circuit so as to detect a load transient in which the DC output voltage suddenly changes in a decreasing direction, and to output a load transient detection signal to the control circuit; wherein:

the control circuit performs switching control on the semiconductor switch upon reception of the load transient detection signal so that the output voltage detection portion can detect the DC output voltage appearing after the reception of the load transient detection signal;

the control circuit outputs the control signal with a frequency which is lower as the DC output voltage is more stable or which increases as the DC output voltage decreases; and the control circuit stops oscillation of the control signal in a low frequency range including an audible range.

* * * * *